(12) United States Patent
Dehghan

(10) Patent No.: US 6,556,635 B1
(45) Date of Patent: Apr. 29, 2003

(54) COMMUNICATIONS RECEIVER HAVING ADAPTIVE DYNAMIC RANGE

(75) Inventor: Hossein Dehghan, Danville, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/436,535

(22) Filed: Nov. 9, 1999

(51) Int. Cl.[7] .................................................. H04L 27/08
(52) U.S. Cl. ...................... 375/345; 375/317; 455/245.1
(58) Field of Search ................................. 375/317, 319, 375/345; 330/10, 83, 85, 96, 129, 134; 455/232.1, 234.1, 239.1, 240.1, 245.1, 250.1, 254, 257; 341/132, 139, 142

(56) References Cited

U.S. PATENT DOCUMENTS

| | | | | | |
|---|---|---|---|---|---|
| 3,851,266 | A | * | 11/1974 | Conway | 327/307 |
| 4,827,191 | A | * | 5/1989 | Chapman | 341/132 |
| 5,194,865 | A | * | 3/1993 | Mason et al. | 341/132 |
| 5,341,218 | A | * | 8/1994 | Kaneko et al. | 348/691 |
| 5,469,115 | A | * | 11/1995 | Peterzell et al. | 330/129 |
| 5,774,085 | A | * | 6/1998 | Yanagimoto et al. | 341/155 |
| 5,861,831 | A | * | 1/1999 | Murden et al. | 341/118 |
| 5,917,865 | A | * | 6/1999 | Kopmeiners et al. | 375/345 |
| 5,946,607 | A | * | 8/1999 | Shiino et al. | 455/234.1 |
| 6,038,266 | A | * | 3/2000 | Lee et al. | 375/317 |
| 6,240,100 | B1 | * | 5/2001 | Riordan et al. | 370/442 |
| 6,314,278 | B1 | * | 11/2001 | Zamat | 455/239.1 |
| 6,332,205 | B1 | * | 12/2001 | Conway | 714/746 |
| 6,415,003 | B1 | * | 7/2002 | Raghavan | 327/307 |
| 6,445,736 | B1 | * | 9/2002 | Wheeler | 375/235 |

* cited by examiner

Primary Examiner—Chi Pham
Assistant Examiner—Khanh Cong Tran
(74) Attorney, Agent, or Firm—Westman, Champlin & Kelly

(57) ABSTRACT

A communications receiver includes an analog input for receiving an analog signal having a time-varying DC voltage drift. A variable gain amplifier is coupled to the analog input and is adapted to amplify the analog signal based on a gain set by a gain control input to the amplifier. An analog-to-digital (A/D) converter is coupled to an output of the amplifier and is adapted to convert the amplified analog signal to a series of digital values. A drift estimator is coupled to the A/D converter, which generates an estimate of the time-varying DC voltage drift based on the series of digital values. A gain adjuster is coupled between the drift estimator and the amplifier, which adjusts the gain control input based on the drift estimate.

16 Claims, 3 Drawing Sheets

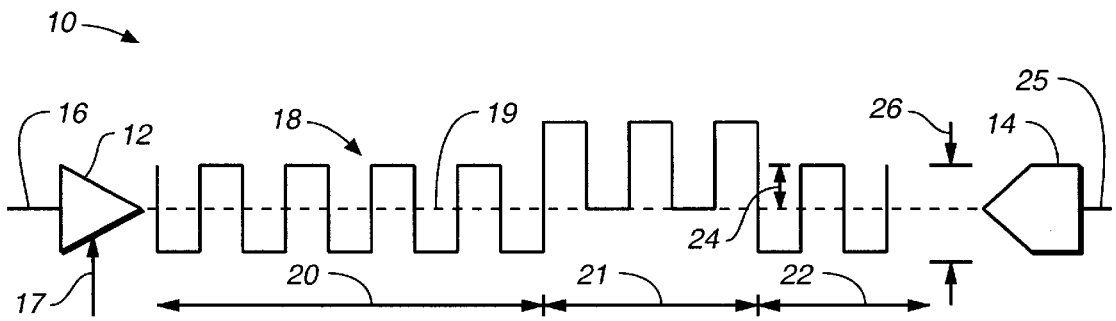
FIG._1
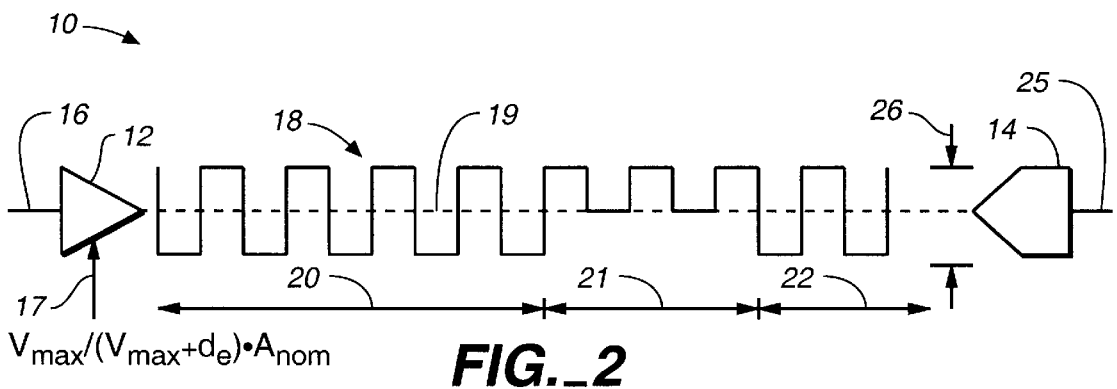
FIG._2
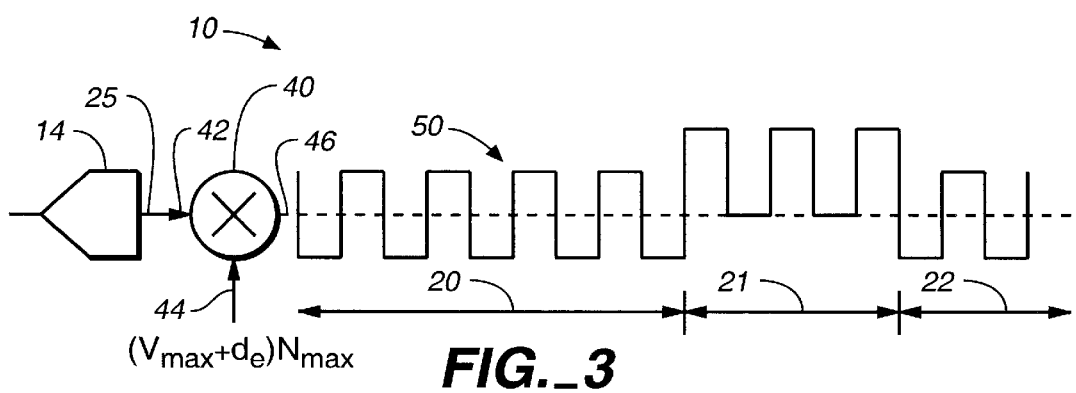
FIG._3

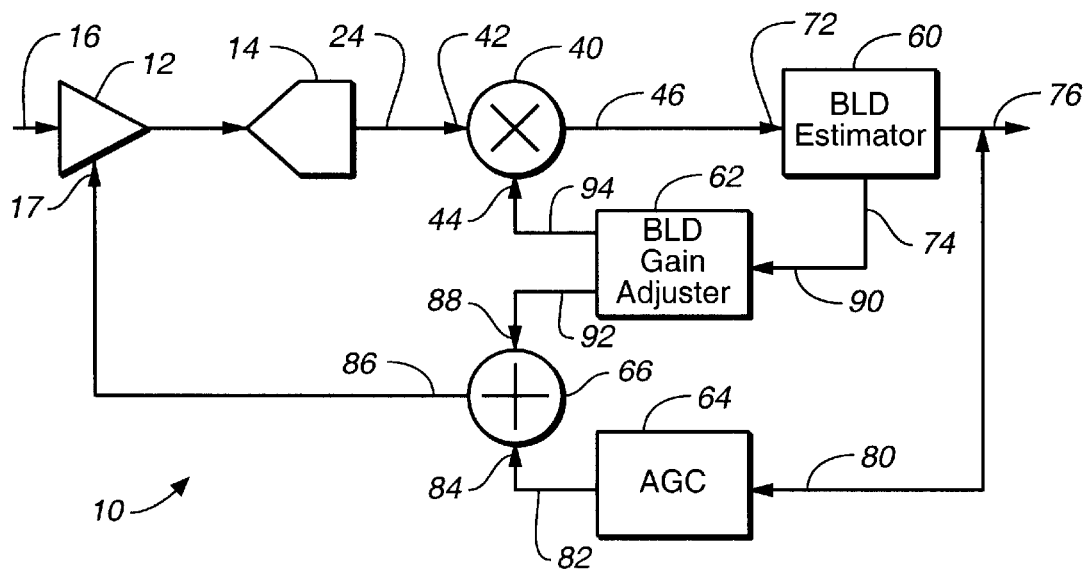
FIG._4
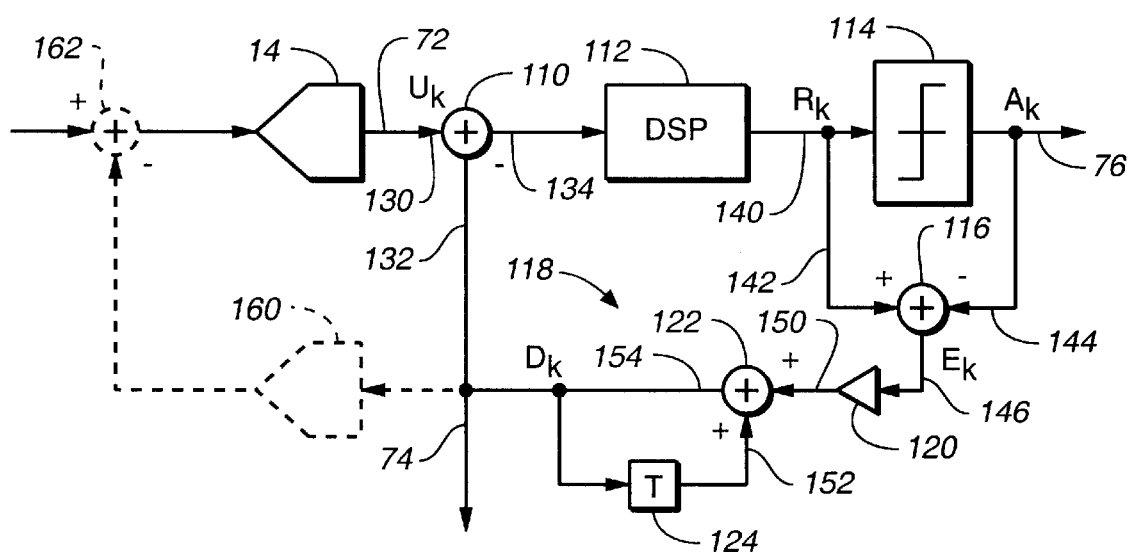
FIG._5

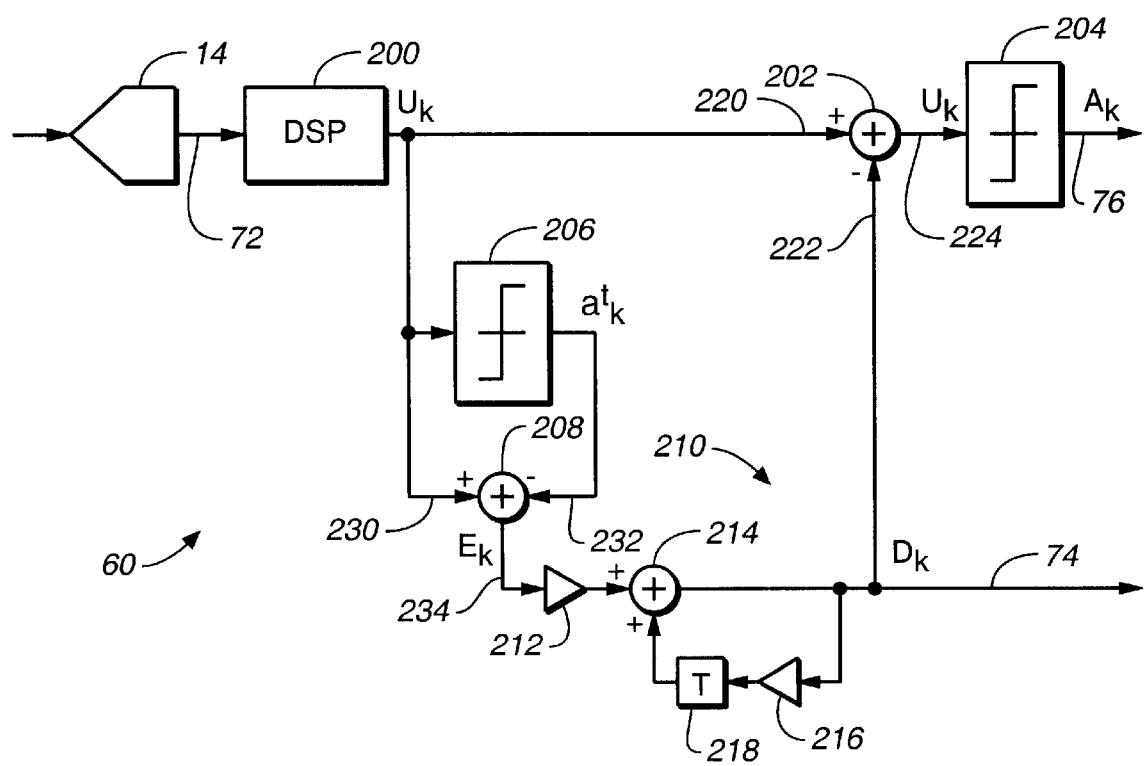
FIG._6

COMMUNICATIONS RECEIVER HAVING ADAPTIVE DYNAMIC RANGE

BACKGROUND OF THE INVENTION

The present invention relates to communications receivers and, more particularly, to a communications receiver having adaptive dynamic range in the presence of time-varying DC voltage drift.

In a typical communication system, analog signals are transmitted from a transmitter to a receiver through a transmission channel. A typical receiver includes an amplifier, an analog-to-digital (A/D) converter and an automatic gain controller. The amplifier amplifies the received AC analog signal, which is then converted by the A/D converter into a series of digital values that can be processed. The automatic gain controller monitors the signal power and adjusts the amplifier gain to restore the received signal to desired power level.

The A/D converter has a maximum peak-to-peak voltage range within which it is capable of converting analog voltage levels into corresponding unique digital values. Analog voltage levels outside that range are "clipped" and converted into a digital value corresponding to the next closest analog voltage level within the range. The size of the range is determined by the number of bits in the A/D converter and the resolution of each bit. These values are typically tuned for a particular application so that the dynamic range of the A/D converter matches or slightly exceeds the expected peak-to-peak voltage span of the received AC analog signal.

A common difficulty encountered in many communications receivers is DC voltage drift in the peak-to-peak voltage span of the received AC analog signal. DC voltage drift can cause the AC analog signal to shift outside the dynamic range of the A/D converter, which results in clipping of the analog signal and consequent loss of data. DC voltage drift is common in a variety of communications systems, such as systems that receive low frequency random data signals, systems that use transformer coupling, AC coupling and DC notching and any other system suffering from DC voltage drift or baseline wander at the transmitter or receiver or in the transmission channel. Examples of such systems include wire line modems, digital subscriber line (DSL) and cable communication systems, and Ethernet, radar and television receivers.

There are two common methods of correcting for DC voltage drift. The first is to allow for sufficient dynamic range or "head room" in the A/D converter to ensure operation without clipping. This can be done by either increasing the number of bits in the A/D converter or by reducing the resolution of the converter to cover a larger peak-to-peak voltage span with the same number of bits. However, the cost and complexity of the A/D converter increase exponentially with the number of bits in the converter. Also, decreasing the resolution decreases the signal-to-quantization noise ratio of the A/D converter and hence degrades the performance of the receiver.

The second common method of dealing with DC voltage drift is to correct the drift prior to the input of the A/D converter. This option requires a good estimate of the DC voltage drift, which is preferably performed digitally. This requires additional circuitry, such as a digital-to-analog (D/A) converter or a delta modulator, to transport the DC drift estimate back to the analog domain such that the DC drift can be corrected prior to the input of the A/D converter. The addition of such a mixed signal device adds to the complexity of the hardware, which makes the design and testing of the hardware more difficult. Moreover, if the DC drift varies rapidly with time, fast estimation and correction of the DC drift becomes critical, which makes the use of more economic methods of under-sampled D/A converters or delta modulators prohibitive.

Improved methods and circuits for expanding the effective dynamic range of A/D converters in communications receivers are desired.

SUMMARY OF THE INVENTION

One aspect of the present invention relates to a communications receiver, which includes an analog input for receiving an analog signal having a time-varying DC voltage drift. A variable gain amplifier is coupled to the analog input and is adapted to amplify the analog signal based on a gain set by a gain control input to the amplifier. An analog-to-digital (A/D) converter is coupled to an output of the amplifier and is adapted to convert the amplified analog signal to a series of digital values. A drift estimator is coupled to the A/D converter, which generates an estimate of the time-varying DC voltage drift based on the series of digital values. A gain adjuster is coupled between the drift estimator and the amplifier, which adjusts the gain control input based on the drift estimate.

Another aspect of the present invention relates to a method expanding the effective dynamic range of a communications receiver, which includes a variable gain amplifier and an analog-to-digital (A/D) converter. The receiver receives an analog signal having a time-varying DC voltage drift. The analog signal is amplified with the amplifier to generate an amplified analog signal. The gain of the amplifier is set to a nominal gain level. The amplified analog signal is converted to a series of digital values by the A/D converter. The DC voltage drift is estimated based on the series of digital values. The gain is reduced from the nominal gain level to a reduced gain level during a time window in which the estimated DC voltage drift exceeds a threshold value.

Yet another aspect of the present invention relates to a communications receiver for receiving an analog signal having a time-varying DC voltage drift. The receiver includes an amplifier for amplifying the analog signal. The gain of the amplifier is set to a nominal gain level. An analog-to-digital converter converts the amplified analog signal to a series of digital values. A drift estimator estimates the DC voltage drift based on the series of digital values. A gain adjuster reduces the gain from the nominal gain level to a reduced gain level during a time window in which the estimated DC voltage drift exceeds a threshold value.

BRIEF DESCRIPTION OF THE DRAWINGS

FIG. 1 is a schematic representation of a communications receiver, which illustrates time-varying DC voltage drift in an AC analog input signal.

FIG. 2 is a schematic representation of the communications receiver, which illustrates a temporary gain reduction to avoid saturation of an A/D converter in the receiver.

FIG. 3 is a schematic representation of the communications receiver, which illustrates restoration of the reduced gain after the A/D converter.

FIG. 4 is a block diagram showing the receiver in more detail according to one embodiment of the present invention.

FIG. 5 is a block diagram of a baseline drift estimator in the receiver, which has a feed forward implementation according to one embodiment of the present invention.

FIG. 6 is a block diagram of a baseline drift estimator in the receiver, which has a feed back implementation according to another embodiment of the present invention.

DETAILED DESCRIPTION OF THE ILLUSTRATIVE EMBODIMENTS

A/D converter saturation and clipping are avoided in the present invention by adjusting the gain applied by the amplifier in the communications receiver. The receiver keeps a running estimate of any DC voltage drift in the received analog signal and reduces the gain of the amplifier when the drift grows large enough to cause clipping by the A/D converter. In one embodiment, the gain is reduced in proportion to the magnitude of the DC drift. The gain is later restored in the digital domain.

FIG. 1 is a schematic representation of a communications receiver, which illustrates time-varying DC voltage drift in an AC analog input signal. Receiver 10 includes variable gain amplifier (VGA) 12 and analog-to-digital (A/D) converter 14. VGA 12 receives an AC analog input signal on receiver input 16, amplifies the signal by a selected gain to produce an amplified analog signal 18 and provides the amplified analog signal 18 to the input of A/D converter 14. The gain applied by VGA 12 is selected through gain control input 17, typically by an automatic gain controller (not shown in FIG. 1). Signal 18 has a nominal DC voltage level or "baseline" 19. Signal 18 is labeled in FIG. 1 with time windows 20–22. During time windows 20 and 22, signal 18 has a peak-to-peak voltage span that is symmetrical about nominal DC voltage level 19. However, during time window 21, the peak-to-peak voltage span of signal 18 has drifted upwards relative to the nominal DC voltage level 19. The magnitude of the DC drift is shown by arrow 24.

A/D converter 14 converts amplified analog signal 18 into a series of digital values on output 25. However, A/D converter 14 has a limited dynamic range 26. Analog voltages outside range 26 are clipped by A/D converter 14. During time window 21, the peak-to-peak voltage span of signal 18 has shifted outside dynamic range 26. To avoid clipping by A/D converter 14, the gain of VGA 12 is reduced during time window 21 from the nominal gain applied by VGA 12 during time periods 20 and 22 to a reduced gain, as shown in FIG. 2. Steady monitoring of the DC voltage drift enables receiver 10 to return the gain applied by VGA 12 back to the nominal gain level once the DC voltage drift has disappeared or dropped below a selected threshold level, as in time period 22. Reducing the gain of VGA 12 during time periods in which the DC voltage drift grows large enough to otherwise cause clipping by A/D converter 14 has the effect of expanding the effective dynamic range of A/D converter 14.

In one embodiment, the gain applied by VGA 12 is reduced from the nominal gain level by a gain reduction factor, $$\frac{V_{MAX}}{V_{MAX} + D_E} \qquad \text{Eq. 1}$$

where $V_{MAX}$ is the maximum analog signal magnitude within dynamic range 26 of A/D converter 14 and $D_E$ is the running estimate of the DC voltage drift. This factor is effectively multiplied by the nominal gain $A_{NOM}$ set by the automatic gain controller. When $D_E$ is zero, the gain reduction factor is unity. Other gain reduction factors can also be used which are proportional to the drift estimate $D_E$ or independent of the drift estimate $D_E$. For example, a fixed reduction factor can be used.

The reduction in gain during time window 21 causes a temporary decrease in the nominal signal power, which decreases the signal-to-quantization noise ratio of receiver 10. This can adversely effect the receiver's performance during the period that the VGA gain has been reduced. However, since the baseline drift phenomenon occurs infrequently in a typical communications receiver, the temporary decrease in signal power and hence signal-to-quantization noise ratio should not effect the overall system performance significantly.

FIG. 3 is a diagram illustrating restoration of the nominal gain within the digital values generated by A/D converter 14 on output 25. Receiver 10 further includes a digital multiplier 40 having first and second operand inputs 42 and 44 and a product output 46. Output 25 of A/D converter 14 is coupled to operand input 40. The digital values received on input 42 are multiplied by a gain restoration factor received on operand input 44, which represents the inverse of the gain reduction factor applied to VGA 12. In one embodiment, the gain restoration factor can be expressed by the following equation, $$\frac{V_{MAX} + D_E}{V_{MAX}} \qquad \text{Eq. 2}$$

The digital values generated on product output 46 are represented by waveform 50. As discussed above, the DC voltage drift during time windows 20 and 22 is zero. Thus, the restoration gain factor shown in Equation 2 is unity for time windows 20 and 22. However, the restoration gain factor is greater than unity during time period 21. This restores the magnitudes of the digital values that correspond to time period 21 to levels that represent the original analog voltage levels before the gain reduction.

FIG. 4 is a block diagram showing receiver 10 in more detail according to one embodiment of the present invention. Receiver 10 includes VGA 12, A/D converter 14, digital multiplier 40, baseline drift (BLD) estimator 60, baseline drift gain adjuster 62, automatic gain controller (AGC) 64 and summing element 66. The digital values generated on output 46 of multiplier 42 are applied to input 70 of baseline drift estimator 60. Baseline drift estimator 60 monitors the digital values received on input 72 and generates a running estimate of the DC voltage drift in the analog signals received on receiver input 16. Baseline drift estimator 60 applies the drift estimate to estimate output 74. Baseline drift estimator 60 also generates a series of digital values on data output 76, in which the DC drift has been removed by subtracting the running drift estimate from each of the digital values. The operation of baseline drift estimator 60 is described in more detail below with reference to FIGS. 5 and 6.

AGC 64 has an input 80 coupled to data output 76 and an output 82 coupled to summing element 66. AGC 64 monitors the corrected digital values generated on output 76 and provides a digital AGC gain control value or signal on output 82 for setting the nominal gain of VGA 12 when the drift estimate is less than a predetermined threshold. The AGC gain control value is selected such that VGA 12 restores the received analog signal to its original power level prior to transmission through the channel, as is well known in the art. The AGC gain control value is applied to addend input 84 of summing element 66. Sum output 84 is coupled to gain control input 17. VGA 12 receives the output from summing element 66 and implements the selected gain. In an alternative embodiment, AGC 64 is replaced with an open-loop gain control signal source, which applies a pre-selected gain control signal or value to summing element 66.

Baseline drift gain adjuster 62 receives the baseline drift estimate on input 90 and generates a corresponding digital gain reduction value on output 92. The gain reduction value is proportional to the magnitude of the baseline drift estimate. Output 92 is coupled to subtrahend input 88 of summing element 66. The gain reduction value received on subtrahend input 88 is subtracted from the AGC gain control value received on addend input 84. The result is applied to sum output 86 as an adjusted VGA gain control value. Thus, the larger the baseline drift estimate, the smaller the adjusted VGA gain control value and, hence, the smaller the VGA gain.

In one embodiment, the gain reduction value provided on output 92 is zero when the running baseline drift estimate received from estimator 60 is less than a predetermined drift threshold. Baseline drift gain adjuster 62 can be implemented with a simple look-up table or a state machine for generating the appropriate gain reduction value based on the estimated DC drift.

Baseline drift gain adjuster 62 also generates a digital gain restoration factor on output 94, which is coupled to operand input 44 of multiplier 40. The digital values received on operand input 42 are multiplied by the gain restoration factor received on operand input 44 to reverse the gain change in VGA 12, as discussed above. The digital values applied to baseline drift estimator 60 are therefore not affected by the gain reduction operation. In one embodiment, the gain restoration factor is expressed by Equation 2 above, which is inverse of the gain reduction factor applied by VGA 12.

During operation, when the estimated baseline drift is determined to be large enough to cause A/D converter 14 to clip the analog input signal, gain adjuster 62 causes the gain setting of VGA 12 to change from its nominal value set by automatic gain controller 64 to a reduced value. When the DC drift disappears from the received AC signal, baseline drift estimator 60 will detect no significant DC drift, and gain adjuster 62 will revert the gain setting of VGA 12 to its nominal setting dictated by automatic gain controller 64 and will return its internal gain compensation to unity at output 94.

Baseline drift estimator 60 and gain adjuster 62 allow an effective increase in the dynamic range of A/D converter 14 in the presence of DC drift. This allows a much more economical and reliable implementation of a communications receiver since it eliminates the need for extra mixed mode hardware that is often needed by DC drift compensation systems of the prior art. Receiver 10 reduces the cost of the receiver by handling most of the compensation and gain adjustment functions in the digital domain. This can be done with little increase in computational complexity and addition to digital hardware and greatly decreases mixed signal hardware requirements. This in turn allows significant hardware savings for implementations within application specific integrated circuits (ASICs) as well as digital signal processors (DSPs). Receiver 10 can be used in any analog communication system suffering from DC drift and baseline wander at the transmitter, receiver or in the communications channel. For example, communications receiver 10 can be used in wire line modems, DSL and cable communication systems, and Ethernet, radar and television receivers.

In an alternative embodiment, automatic gain. controller 64, summing element 66 and gain control input 17 operate in the analog domain. In this embodiment, input 80 of automatic gain controller 64 is coupled to the output of VGA 12, and a digital-to-analog converter (not shown) is provided between output 92 of gain adjuster 62 and input 88 of summing element 66. In another embodiment, gain control input 17 is adapted to receive an analog gain control signal, while automatic gain controller 64 and summing element 66 operate in the digital domain. In this embodiment, a digital-to-analog converter (also not shown) would be provided between sum output 86 and gain control input 17. Other configurations are also possible.

FIG. 5 is a block diagram of baseline drift estimator 60 having a feed forward implementation according to one embodiment of the present invention. Estimator 60 includes summing element 110, digital signal processor 112, decision device or "slicer" 114, summing element 116 and integrator 118. Integrator 118 includes scaling element or multiplier 120, summing element 122, and time delay element 124. For convenience, A/D converter 14 is also shown in FIG. 5. Multiplier 40 is not shown in FIG. 5 for clarity. The series of digital values generated by A/D converter 14 are provided to input 72 of drift estimator 60. The variable "$U_k$" represents a digital value or symbol U at time instant k. Symbol $U_k$ is applied to addend input 130 of summing element 110. Summing element 110 further includes subtrahend input 132 and sum output 134. Sum output 134 is applied to the input of digital signal processor (DSP) 112.

Digital signal processor 112 conditions the symbols $U_k$ to remove noise from the symbols. The output of digital signal processor 112 provides a series of conditioned, received symbols $R_k$, where "$R_k$" represents a received symbol at time instant k. Received symbol $R_k$ is provided to input 140 of decision device 114 and addend input 142 of summing element 116. Decision device 114 generates an estimate $A_k$ of the actual transmitted symbol for each received symbol $R_k$ based on a decision or slicing mechanism. For example, if received symbol $R_k$ was close to a "1", decision device 114 would declare the detected symbol $A_k$ as a "1".

Detected symbol $A_k$ is applied to subtrahend input 144 of summing element 116, which subtracts detected symbol $A_k$ from received symbol $R_k$ to generate an error estimate $E_k$ on sum output 146. Error estimate $E_k$ represents the DC drift in the received AC signals, but may include noise. Therefore, error estimate $E_k$ is integrated through integrator 118 to produce an integrated drift estimate $D_k$ for time instant k. Scaler 120 scales $E_k$ down by a selected factor and provides the scaled down $E_k$ to addend input 150 of summing element 122. Addend input 152 is coupled to the output of time delay element 124, which has its input coupled to sum output 154 of summing element 122. Time delay element 124 can include a register, for example. In an alternative embodiment, integrator 118 is replaced with a low pass filter. The output of integrator 118 is coupled to subtrahend input 132 of summing element 110 to allow the drift estimate $D_k$ to be subtracted from the incoming digital symbols $U_k$. This removes the time-varying DC voltage drift from the series of digital values generated by A/D converter 14. Drift estimate $D_k$ is also provided to output 74 for use by gain adjuster 62 (shown in FIG. 2). Drift estimate $D_k$ is obtained by monitoring the slicer error estimate $E_k$ over a reasonable window of time. This can be achieved by integrator 118, a low pass filter or any other suitable windowing mechanism.

The solid lines in FIG. 5 illustrate a fully digital or fully analog implementation of baseline drift estimator 60. In an alternative embodiment, estimator 60 has a hybrid digital-analog implementation, as indicated by the dashed lines in FIG. 5. In the hybrid implementation, the drift estimate $D_k$ is passed through a digital-to-analog converter 160 and then subtracted from the amplified analog signal supplied to A/D converter 14, through summing element 162.

A closed loop transfer function from input 72 to output 76 of drift estimator 60 can be obtained by assuming that decision device 114 is a noise source, no slicing errors are made by decision device 114, the frequency response of digital signal processor 112 is unity for the frequency band of interest for drift estimator 60 (i.e., at or near DC), and there are no non-linear devices such as A/D or D/A converters in the loop or, if there are, their effect can be neglected. With the above assumptions, the closed loop transfer function of drift estimator 60 is, $$T(z) = \frac{1}{1 + \mu \cdot H(z)} \qquad \text{Eq. 3}$$

where u is a loop gain parameter, which is a trade off between DC drift tracking speed and tracking noise, H(z) is the transfer function of the error averaging mechanism (e.g., integrator 118). If integrator 118 is used as the error averaging mechanism, as in FIG. 5, the overall closed loop transfer function is, $$T(z) = \frac{1}{1+\mu} \cdot \frac{1 - z^{-1}}{1 - \frac{1}{1+\mu} z^{-1}} \qquad \text{Eq. 4}$$

FIG. 6 is a block diagram illustrating a feed-forward implementation of baseline drift estimator 60 according an alternative embodiment of the present invention. In this embodiment, estimator 60 includes digital signal processor 200, summing element 202, decision device 204, decision device 206, summing element 208 and integrator 210, which includes scaling element 212, summing element 214, scaling element 216 and time delay element 218. The series of digital values generated by A/D converter 14 are provided to digital signal processor 200, which conditions the values to remove noise as in the embodiment shown in FIG. 5 The conditioned digital values are provided to the output of digital signal processor 200, with "$U_k$" representing a digital symbol U at time instant k. The received, conditioned symbol $U_k$ is provided to addend input 220 of summing element 202. Drift estimate $D_k$ is applied subtrahend input 222 of summing element 202 and subtracted from the received symbol $U_k$. The result is provided to output 224, which is also labeled $U_k$. Decision device 204 generates an estimate $A_k$ on output 76 of the actual transmitted symbol based on the received symbol $U_k$, as discussed above with reference to FIG. 5.

The output digital signal processor 200 is also applied to the input of decision device 206 and addend input 230 of summing element 208. Decision device 206 generates a temporary, feed-forward estimate, $A^t_k$ of the actual transmitted symbol based on a slicing mechanism, which is applied to subtrahend input 232 of summing element 208. Summing element 208 subtracts the temporary estimate $A^t_k$ from the received symbol $U_k$ to generate an error estimate $E_k$ on sum output 234. Low pass filter 210 provides a windowing mechanism for removing noise from error estimate $E_k$ for generating the drift estimate $D_k$. The output of integrator 210 is coupled to subtrahend input 222 of summing element 202 and to output 74 for use by gain adjuster 62 shown in FIG. 4.

The embodiments shown in FIGS. 5 and 6 do not require any prior information about the source of the DC voltage drift and can accurately and quickly follow any DC drift error. The DC drift error can include static or slowly moving DC offset or a rapidly changing baseline wander. Prior information about the source and characteristics of the DC voltage drift is seldom available for non-conditioned transmission mediums.

One way of overcoming this problem would be to obtain characteristics of the drift source from the incoming information through some parameter estimation technique. The DC error can be replicated at the receiver by passing the detected data symbols through a filter whose frequency response is similar to that of the channel or receiver causing the DC error. The estimated drift can then be cancelled. In another embodiment an inverse of the drift source can be placed in the received signal's path to directly cancel the effect of the channel and/or receiver component causing the DC error. However, these parameter estimations can be algorithmically inaccurate and can be difficult and expensive to implement. In another alternative embodiment, the baseline drift can be estimated by integrating the received AC or converted digital values over time to provide long term averaging. Other configurations can also be used.

Although the present invention has been described with reference to preferred embodiments, workers skilled in the art will recognize that changes may be made in form and detail without departing from the spirit and scope of the invention. For example, the term "coupled" used in the specification and the claims can include a variety of connections, such as a direct connection or a connection through one or more intermediate elements. Likewise, the term "signal" can include a discrete digital value, a time-varying digital value, a discrete analog level or a time-varying analog level, for example.

What is claimed is:

1. A communications receiver comprising:

an analog input for receiving an analog signal having a time-varying DC voltage drift;

a variable gain amplifier, which is coupled to the analog input and is adapted to amplify the analog signal based on a gain set by a gain control input to the amplifier;

an analog-to-digital (A/D) converter, which is coupled to an output of the amplifier and is adapted to convert the amplified analog signal to a series of digital values;

a drift estimator coupled to the A/D converter, which generates an estimate of the time-varying DC voltage drift based on the series of digital values; and a gain adjuster coupled between the drift estimator and the amplifier, which adjusts the gain control input based on the drift estimate.

2. The communications receiver of claim 1 and further comprising:

an automatic gain controller, which is coupled to the amplifier and is adapted to generate the gain control input based on the series of digital values.

3. The communications receiver of claim 2 wherein:

the gain adjuster comprises means selectively reducing the gain control input when the drift estimate exceeds a drift threshold such that the gain of the amplifier is reduced by a gain reduction factor, which is proportional to the drift estimate.

4. The communications receiver of claim 3 and further comprising:

a digital multiplier coupled between the A/D converter and the drift estimator and having first and second operand inputs and a product output, wherein the first operand input is coupled to the A/D converter for receiving the series of digital values and the product output is coupled to the drift estimator; and wherein the gain adjuster is coupled to the second operand input and is adapted to apply a gain restoring factor to the second operand input, which represents an inverse of the gain reduction factor.

5. The communications receiver of claim 3 wherein the means for selectively reducing comprises means for generating a gain reduction control signal based on the drift estimate and means for subtracting the gain reduction control signal from the gain control input.

6. The communications receiver of claim 2 wherein the DC voltage drift estimator comprises means for subtracting the drift estimate from the series of digital values to thereby generate a series of corrected digital values.

7. The communications receiver of claim 6 wherein the automatic gain controller is coupled between the drift estimator and the gain control input and is adapted to generate the gain control input based on the series of corrected digital values.

8. The communications receiver of claim 1 and further comprising:
an automatic gain controller, which is coupled to the amplifier for receiving the amplified analog signal and is adapted to generate the gain control input based on the amplified analog signal.

9. A method expanding the effective dynamic range of a communications receiver, which comprises a variable gain amplifier and an analog-to-digital (A/D) converter, the method comprising:
receiving an analog signal having a time-varying DC voltage drift;
amplifying the analog signal with the amplifier to generate an amplified analog signal;
setting a gain of the amplifier to a nominal gain level;
converting the amplified analog signal to a series of digital values with the A/D converter;
estimating the DC voltage drift based on the series of digital values; and
reducing the gain from the nominal gain level to a reduced gain level during a time window in which the estimated DC voltage drift exceeds a threshold value.

10. The method of claim 9 wherein:
the step of reducing the gain comprises reducing the gain by a gain reduction factor, wherein selected ones of the series of digital values correspond to the time window; and
wherein the method further comprises multiplying the selected digital values that correspond to the time window by an inverse of the gain reduction factor.

11. The method of claim 10 wherein the gain reduction factor is proportional to a magnitude of the drift estimate.

12. The method of claim 9 wherein the step of setting the gain comprises:
setting the gain to the nominal gain level with an automatic gain controller based on the series of digital values.

13. The method of claim 12 wherein:
the step of setting the gain further comprises:
generating a gain control signal with the automatic gain controller based on the series of digital values; and
applying the gain control signal to a gain control input to the amplifier; and
the step of reducing the gain comprises:
generating a gain reduction signal, which has a magnitude that is based on a magnitude of the estimated DC voltage drift; and
subtracting the gain reduction signal from the gain control signal, prior to applying the gain control signal to the gain control input.

14. The method of claim 9 and further comprising:
subtracting the estimated DC voltage drift from the series of digital values.

15. The method of claim 9 wherein the step of setting the gain comprises:
setting the gain of the amplifier to the nominal gain level with an automatic gain controller based on the amplified analog signal.

16. A communications receiver for receiving an analog signal having a time-varying DC voltage drift, the receiver comprising:
amplifier means for amplifying the analog signal to generate an amplified analog signal;
means for setting a gain of the amplifier means to a nominal gain level;
means for converting the amplified analog signal to a series of digital values;
means for estimating the DC voltage drift based on the series of digital values; and
means for reducing the gain from the nominal gain level to a reduced gain level during a time window in which the estimated DC voltage drift exceeds a threshold value.

* * * * *